United States Patent [19]

Woolcock

[11] 4,199,185
[45] Apr. 22, 1980

[54] APPARATUS FOR REDUCING THE WIND RESISTANCE IMPOSED ON A PRIME MOVER-TRAILER COMBINATION

[76] Inventor: Graeme E. Woolcock, Lot 1, Coffey Rd., Jandakot, Australia

[21] Appl. No.: 915,800

[22] Filed: Jun. 15, 1978

[30] Foreign Application Priority Data

Jun. 17, 1977 [AU] Australia .............................. PD0490

[51] Int. Cl.² .............................................. B62D 35/00
[52] U.S. Cl. .................................. 296/1 S; 105/2 R; 296/91
[58] Field of Search ............... 296/1 S, 91; 180/1 FV, 180/54 A; 105/2 R, 2 A, 2 B

[56] References Cited
U.S. PATENT DOCUMENTS

| | | | |
|---|---|---|---|
| 3,309,131 | 3/1967 | Saunders | 296/1 S |
| 3,451,469 | 6/1969 | Hall | 180/54 A |
| 3,730,103 | 5/1973 | Weaver | 105/2 A |
| 3,929,202 | 12/1975 | Hobbensiefken | 296/1 S |
| 3,929,369 | 12/1975 | Blair | 296/1 S |

Primary Examiner—Robert R. Song
Assistant Examiner—John A. Carroll
Attorney, Agent, or Firm—Fleit & Jacobson

[57] ABSTRACT

Apparatus for reducing the wind resistance or drag imposed on a prime mover-trailer combination, said apparatus being adapted for mounting on top of the prime mover, said apparatus comprising an upper surface generally extending upwardly and rearwardly from a lower forward portion to an upper rearward portion, and a first vane spaced from the forward portion for directing an air current generally along said upper surface when the prime mover-trailer combination is in forward motion.

6 Claims, 5 Drawing Figures

APPARATUS FOR REDUCING THE WIND RESISTANCE IMPOSED ON A PRIME MOVER-TRAILER COMBINATION

BACKGROUND OF THE INVENTION

1. Field of the Invention

This invention relates to apparatus for reducing the wind resistance or drag imposed on a prime mover-trailer combination.

2. Description of Prior Art

In prime mover-trailer combinations wherein the height of the prime mover cab is substantially less than the height of the trailer, air flowing over the forward end of the cab due to the forward motion of the prime mover is deflected to a minor extent and impinges directly on the flat front surface of the trailer. This causes a marked increase in the drag factor of the prime mover-trailer combination as well as creating an area of intense turbulence between the prime mover cab and the forward face of the trailer. Consequently the air flow over the prime mover-trailer combination as a whole is turbulent; the disturbed airflow extends for a considerable distance around the prime mover-trailer combination.

SUMMARY OF INVENTION

It is an object of this invention to provide an apparatus for reducing the wind resistance or drag imposed on the prime mover-trailer combination.

In one form the invention resides in apparatus for reducing the wind resistance or drag imposed on a prime mover-trailer combination, said apparatus being adapted for mounting on top of the prime mover, said apparatus comprising an upper surface generally extending upwardly and rearwardly from a lower forward portion to an upper rearward portion, and a first vane spaced from the forward portion for directing an air current generally along said upper surface when the prime mover-trailer combination is in forward motion.

In another form the invention resides in apparatus for reducing the wind resistance or drag imposed on a prime mover-trailer combination, said apparatus comprising an upper surface formed integrally with the prime mover, said upper surface generally extending from a lower forward portion to an upper rearward portion and a first vane spaced from the forward portion for directing an air current generally along said upper surface when the prime mover-trailer combination is in forward motion.

Preferably a second vane is spaced from the upper rearward portion of the upper surface, said second vane in combination with an adjacent portion of the upper surface being adapted to define a converging air-flow passage.

Preferably a substantially concave reflex is provided in the upper surface between said lower forward portion and said upper rearward portion.

It is preferred that the first vane is a leading edge slot and the second vane is a symmetrical section airfoil.

BRIEF DESCRIPTION OF DRAWINGS

The invention will be better understood by reference to the following description of several embodiments thereof as shown in the accompanying drawings wherein.

DETAILED DESCRIPTION

Figure 1:
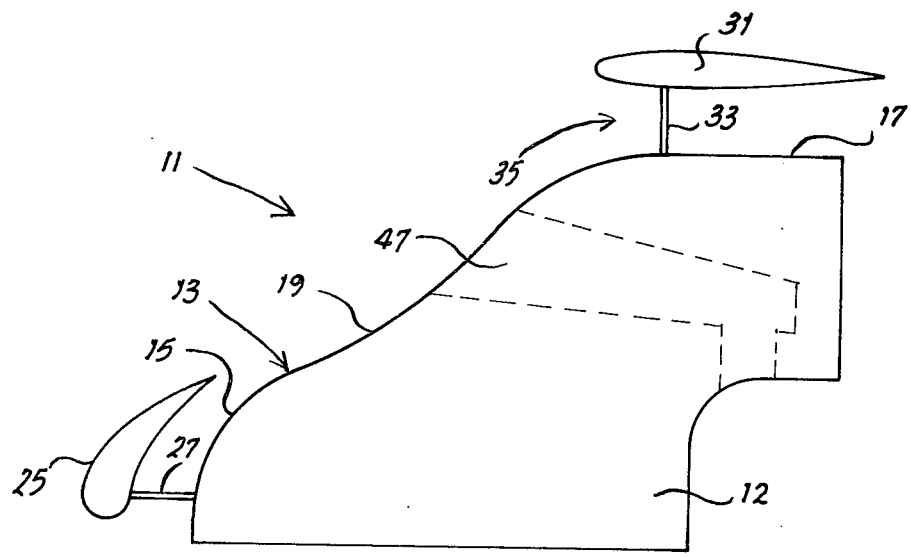
FIG. 1 is a side elevational view of the first embodiment.

In the description of the embodiments of apparatus for reducing wind resistance or drag imposed on a prime mover-trailer combination according to the invention being made with reference to the drawings, the same reference numerals are used to indicate the same or similar parts and/or features of the various embodiments.

As shown in the drawings, the apparatus 11 for reducing wind resistance or drag imposed on a prime mover-trailer combination includes a body portion 12 having an upper surface 13 generally extending upwardly and rearwardly from a lower forward portion 15 to an upper rearward portion 17. A substantially concave reflex 19 is formed in the upper surface 13 between the forward and rearward portion thereof.

Figure 2:
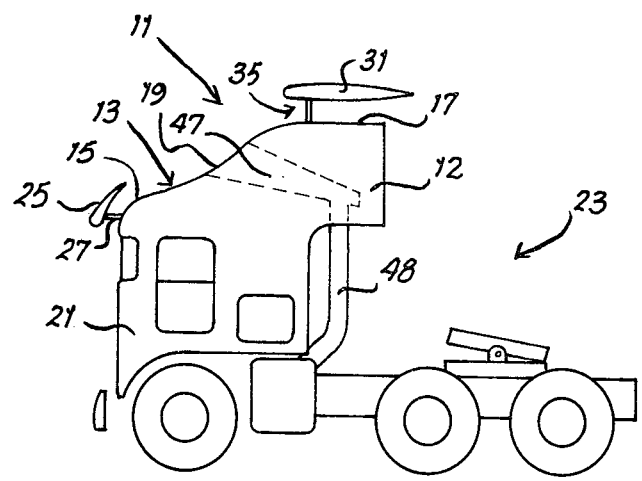
FIG. 2 is a side elevational view of a prime mover fitted with the second embodiment.
Figure 3:
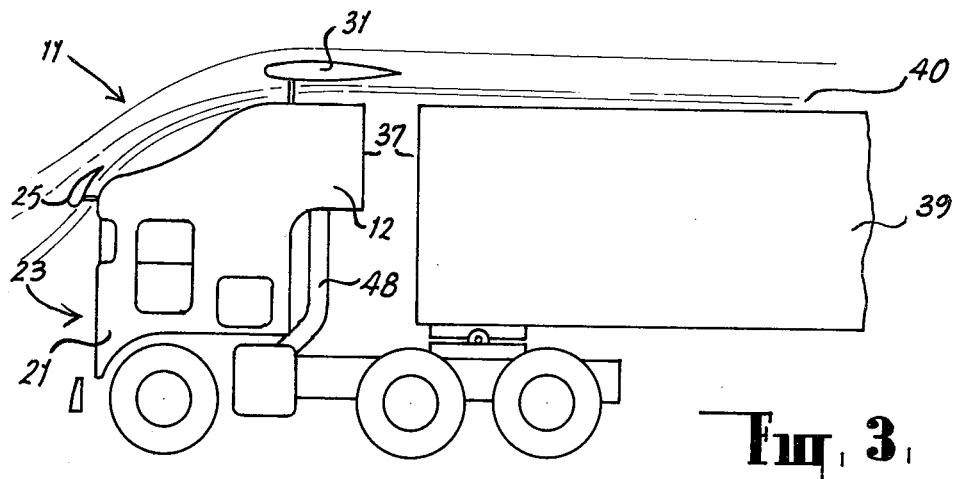
FIG. 3 is a side schematic elevational view illustrating the air flow over the prime mover of FIG. 2 in combination with a trailer.
Figure 4:
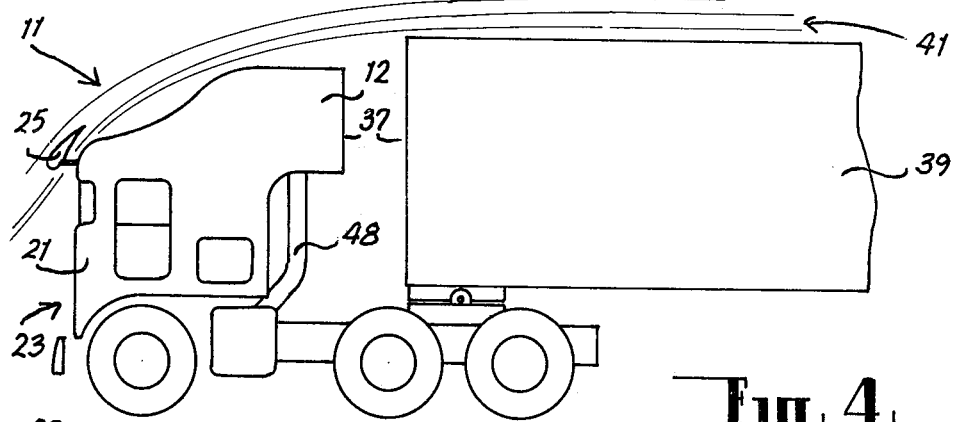
FIG. 4 is a schematic side elevational view illustrating the air flow over a prime mover-trailer combination wherein the prime mover is fitted with the third embodiment.

As shown in FIGS. 2, 3 and 4 of the drawings, the body portion 12 is formed integrally with the cab 21 of a prime mover 23, such that the upper surface 13 is integral with the roof of the cab. However, in an alternative form of the invention as shown in FIG. 1 of the drawings, the apparatus 11 is formed separately from the prime mover and is adapted for mounting on top thereof.

A first vane 25 spaced from the lower forward portion 15 is provided to direct an air flow generally along the upper surface 13 in a rearward direction when the prime mover-trailer combination is in forward motion, thus having the effect of reducing the height of turbulent air flow above the vehicle. The vane 25 extends completely across the upper surface of the body portion 12 terminating at or near the sides thereof. The leading edge portion of the vane is substantially transverse to the direction of travel of the prime-mover trailer combination. The first vane is preferably a leading edge slot and is mounted on mounting means 27 such as adjustable brackets fitted to the body portion 12.

As shown in FIGS. 1 and 3 of the drawings the apparatus 11 may be provided with a second vane 31 spaced from the upper rearward portion 17 of the upper surface. The second vane is mounted on mounting means 33 such as adjustable brackets fitted to the body portion 12. The second vane is preferably a symmetrical-section airfoil so as to have minimal turbulent effect on the air current flowing along the upper surface 13. The second vane 31 extends completely across the upper surface of the body portion 12 terminating at or near the sides thereof. The leading edge portion of the second vane is substantially transverse to the direction of travel of the prime mover-trailer combination. The vane 31 in combination with the adjacent portion of the upper surface defines a converging air flow passage 35. Air exiting from the passage 35 is at an increased velocity and decreased pressure relative to air entering the passage; thus the pressure differential between air in the region of the outlet side of the passage 35 and air in the gap 37 between the prime mover and a trailer 39 in combination with the prime mover is reduced. As a result the amount of relative wind being drawn into the gap 37 is reduced and hence the induced or paraside drag of the prime mover-trailer combination is reduced.

The reflux 19 in the upper surface 13 creates a relatively high pressure zone in the region of the reflex as well as improving the characteristics of the converging air flow passage 35.

The apparatus 11 is preferably provided with the second vane 31 when the height of the upper rearward portion 17 of the apparatus when said apparatus is fitted to the prime mover is substantially equal to the height of the trailer (as shown in FIG. 3).

In this case the air stream exiting from the passage 35 is substantially laminar and substantially parallel to the top face of the trailer 39; the air stream is illustrated by the lines 40 in FIG. 3 of the drawings. However, if the height of the trailer is greater than that of the portion 17 of the apparatus 11, the upper portion of the leading face of the trailer would impede the laminar air stream exiting from the passage 35, thus creating a region of turbulent air flow in the region of the gap 37. Thus in instances where the height of the trailer is greater than the height of the upper portion 17 of the apparatus, it is preferable that the second vane 31 is not fitted to the apparatus. When the second vane is not fitted the air stream which is directed along the upper surface 13 of the apparatus by the first vane 25 passes over the leading face and along the top face of the trailer rather than being directed into the leading face of the trailer; the air stream is illustrated by the lines 41 in FIG. 4 of the drawings.

Figure 5:
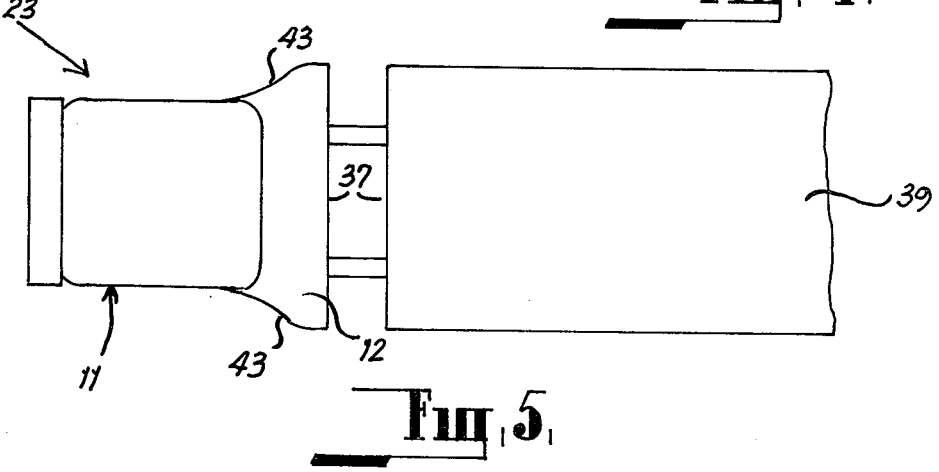
FIG. 5 is a schematic plan view of prime mover-trailer combination wherein the prime mover is fitted with the fourth embodiment.

As shown in FIG. 5, where the cab width of the prime mover 23 is substantially less than the width of the trailer 39, the body portion 12 of the apparatus may be provided with rearwardly diverging side portions 43 to accomodate the variation in width.

If desired an air passage 47 formed in the body portion 12 may lead from the region of relatively high pressure associated with the reflex 19 of the apparatus 11 to the air induction system 48 of the engine of the prime mover. Inlets for conventional air induction systems of prime movers are normally located either behind the rear face of the cab of the prime mover or rearward of the upper leading edge of the cab. These locations become regions of relatively low pressure when the prime mover is in motion, and thus engine performance is affected because of the resulting low manifold pressure. The induction of air from the relatively high pressure zone associated with the reflex 19 improves the volumetric efficiency of the engine. In addition, because of the position of the inlet of the air passage 47, the intake of foreign matter such as dust into the air induction system is reduced. The air passage is preferably provided with a suitable moisture eliminator.

The region enclosed by the body portion 12 of the apparatus provides useful space which may be utilised for storage, as a housing for an air conditioning unit, or in the case where the body portion is formed integrally with the cab of the prime mover, increased cab space.

In operation of apparatus fitted with only the first vane 25, forward movement of the prime mover-trailer combination causes an air flow over the forward end of the prime mover. The vane 25 directs a portion of this air flow along the upper surface 13 of the apparatus. The air stream 41 passes across the gap 37, over the leading face of the trailer and along the top face of the trailer. The air stream 41 is substantially laminar and hence wind resistance or drag imposed on the prime mover-trailer combination is reduced.

In operation of apparatus fitted with both the first vane 25 and the second vane 31, a portion of the total airflow passing over the forward end of the prime mover due to forward movement of the prime mover-trailer combination is directed along the upper surface 13 by the first vane 25. The air stream 40 passes through the coverging passage 35 and is directed such that it flows across the gap 37 and along the top face of the trailer substantially parallel thereto. The air stream 40 is substantially laminar and hence wind resistance or drag imposed on the prime mover-trailer combination is reduced. In addition the reduction of the induced or parasite drag associated with the air flow relative to the gap 37 between the prime mover-trailer combination assists in reducing the overall drag of the prime mover-trailer combination.

Under test, a prime mover-trailer combination fitted with apparatus according to the invention showed an average increase of 14.15% in the miles travelled per gallon of fuel. In addition a prime mover-trailer combination not fitted with said apparatus required an engine speed of 1900 r.p.m. to maintain a road speed of 110 k.p.h. However, under the same conditions the same prime mover-trailer combination required an engine speed of only 1720 r.p.m. to maintain the road speed of 110 k.p.h. when fitted with apparatus according to the invention.

Although the invention has been described with reference to the specific embodiments, it is not limited thereto.

I claim:

1. Apparatus for reducing the wind resistance or drag imposed on a prime mover-trailer combination, said apparatus being adapted to mounting on top of the prime mover, said apparatus comprising an upper surface generally extending upwardly and rearwardly from a lower forward portion to an upper rearward portion, a substantially concave reflex being provided in the upper surface between said lower forward portion and said upper rearward portion, and a first vane spaced from the forward portion for directing an air current generally along said upper surface when the prime mover-trailer combination is in forward motion.

2. Apparatus as claimed in claim 1 wherein a second vane is spaced from the upper rearward portion, said second vane in combination with an adjacent portion of said upper surface being adapted to define a converging air-flow passage.

3. Apparatus as claimed in claim 1 wherein a relatively high pressure region is associated with said reflex when the prime mover-trailer combination is in forward motion, an air passage being provided to lead from said region of relatively high pressure to the air introduction system of the engine of the prime mover.

4. Apparatus for reducing the wind resistance or drag imposed on a prime mover-trailer combination, said apparatus comprising an upper surface formed integrally with the prime mover, said upper surface generally extending upwardly and rearwardly from a lower forward portion to an upper rearward portion, a substantially concave reflex being provided in the upper surface between said lower forward portion and said upper rearward portion, and a first vane spaced from the forward portion for directing an air current generally along said upper portion when the prime mover-trailer combination is in forward motion.

5. Apparatus as claimed in claim 4 wherein a second vane is spaced from the upper rearward portion, said second vane in combination with an adjacent portion of said upper surface being adapted to define a converging air-flow passage.

6. Apparatus as claimed in claim 4 wherein a relatively high pressure region is associated with said reflex when the prime mover-trailer combination is in forward motion, an air passage being provided to lead from said region of relatively high pressure to the air induction system of the engine.

* * * * *